Figure 1:
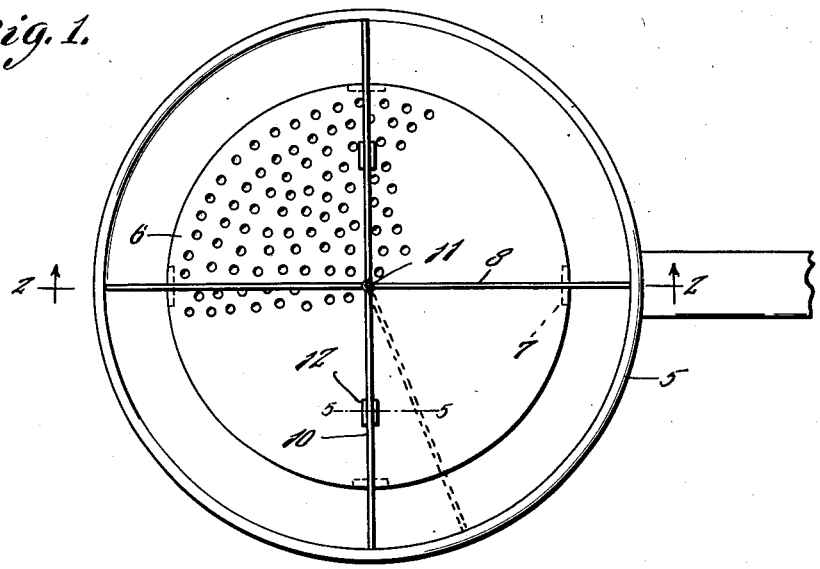

Feb. 10, 1931.　　　G. E. DUNCAN　　　1,791,889
COOKING UTENSIL
Original Filed March 15, 1929　　2 Sheets-Sheet 1

Inventor

*Grace E. Duncan*

By *Clarence A. O'Brien*
　　　　　　Attorney

Feb. 10, 1931.   G. E. DUNCAN   1,791,889
COOKING UTENSIL
Original Filed March 15, 1929   2 Sheets-Sheet 2

Inventor
Grace E. Duncan

By Clarence A. O'Brien
Attorney

Patented Feb. 10, 1931

1,791,889

UNITED STATES PATENT OFFICE

GRACE E. DUNCAN, OF SCARSDALE, NEW YORK

COOKING UTENSIL

Application filed March 15, 1929, Serial No. 347,296. Renewed November 28, 1930.

The present invention relates to a cooking utensil and has for its prime object to provide a utensil divided into a plurality of compartments by partitions so that a plurality of vegetables or the like may be cooked simultaneously.

Another very important object of the invention resides in the provision of partitions with adjustable pieces whereby the size of the compartments may be varied.

A still further very important object of the invention resides in the provision of a cooking utensil of this nature which is exceedingly simple in its construction, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
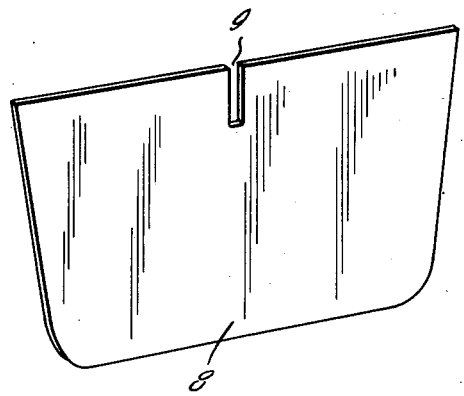
Figure 6:
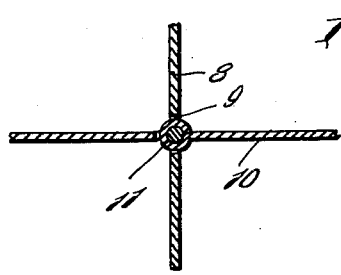
Figure 2:
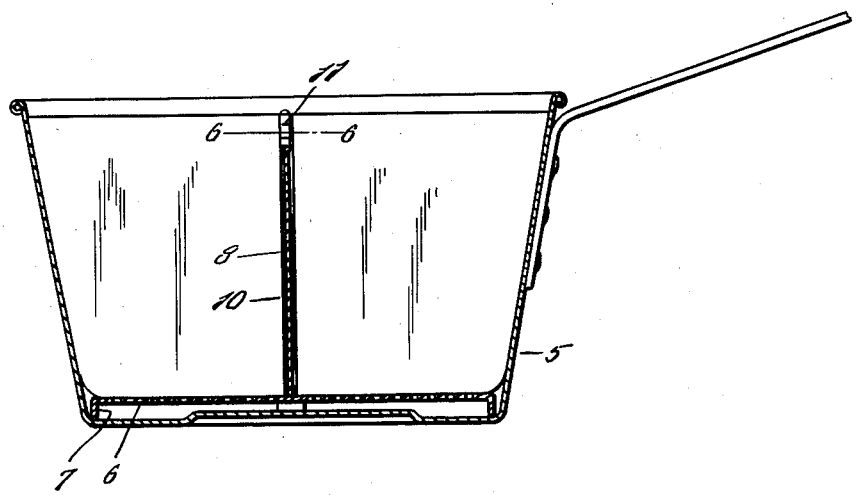
Figure 3:
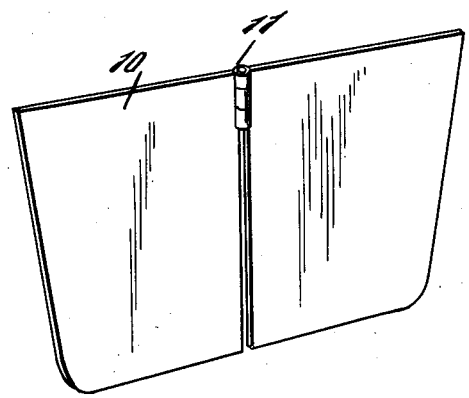
Figure 5:
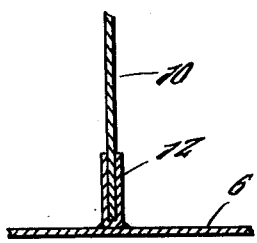

In the drawing:

Figure 1 is a top plan view of the utensil embodying the features of my invention, Figure 2 is a vertical section therethrough taken substantially on the line 2—2 of Figure 1, Figure 3 is a perspective view of a pair of hingedly connected partition members, Figure 4 is a perspective view of another partition, Figure 5 is an enlarged detailed section taken substantially on the line 5—5 of Figure 1, and Figure 6 is an enlarged detail section taken substantially on the line 6—6 of Figure 2.

Referring to the drawing in detail it will be seen that the numeral 5 denotes a pan forming a receptacle. In the present instance this pan is shown as of circular formation having its side walls tapering downwardly in diameter. The specific construction of the pan or receptacle 5 however is not of the essence of invention.

A foraminous sheet 6 is supported on the bottom of the pan in spaced relation to the bottom by means of feet 7. A diametrically extending partition 8 is disposed on the bottom across the pan and has a notch 9 depending from the center of the upper edge thereof. A pair of partition elements 10 are disposed one to each side of the partition 8 and are connected at their upper portions by a hinge joint 11 to be received in the notch 9 so that the elements 10 may be disposed in the same plane with each other or may be swung at an angle to each other and thus the size of the compartment formed by the partition may be regulated.

It is preferable to provide two pair of spaced ears 12 rising from the plate 6 to receive the lower edge of the partition 8.

From the above detailed description it will be seen that this utensil may be used for cooking a number of vegetables or the like at the same time and that the compartments may be varied in size to suit the dishes. Thus the utensil is a labor saver, money saver, space saver, time saver etc. Furthermore the utensil because of the plate of foraminous sheet on the bottom functions as a steamer as water may be contained in the space between the plates and the bottom of the utensil to allow the steam to permeate through the vegetables in the compartment.

It is thought that the construction, utility and advantages of this invention will now be quite apparent to those skilled in this art without a more detailed description thereof. The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention what I claim as new is:

In a utensil of the class described, a receptacle, a foraminous plate resting on the bottom of the receptacle, and having a pair of spaced ears diametrically disposed on the upper face of said foraminous plate, means on the plate for supporting the latter in spaced relation to the bottom of the receptacle, a fixed partition having its bottom edge slidably seated in the ears and the bottom edges thereof resting on said plate, said partition provided with a notch at its upper margin, a pair of partition elements one to each side of the fixed partition, means for hingedly connecting said pair of partition elements together at their upper ends, said means located in said notch and the bottom edges of said pair of partition elements resting on the foraminous plate.

In testimony whereof I affix my signature.

GRACE E. DUNCAN.